Feb. 6, 1968  A. J. LUDEN  3,367,859
CONTROL DEVICE FOR ELECTROPLATING BATH
Filed Dec. 26, 1963
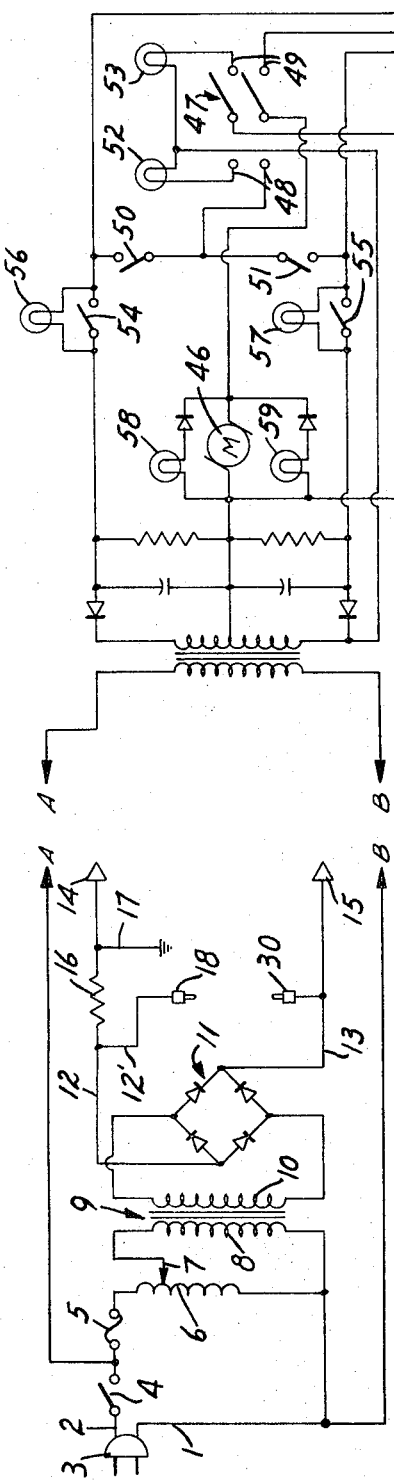
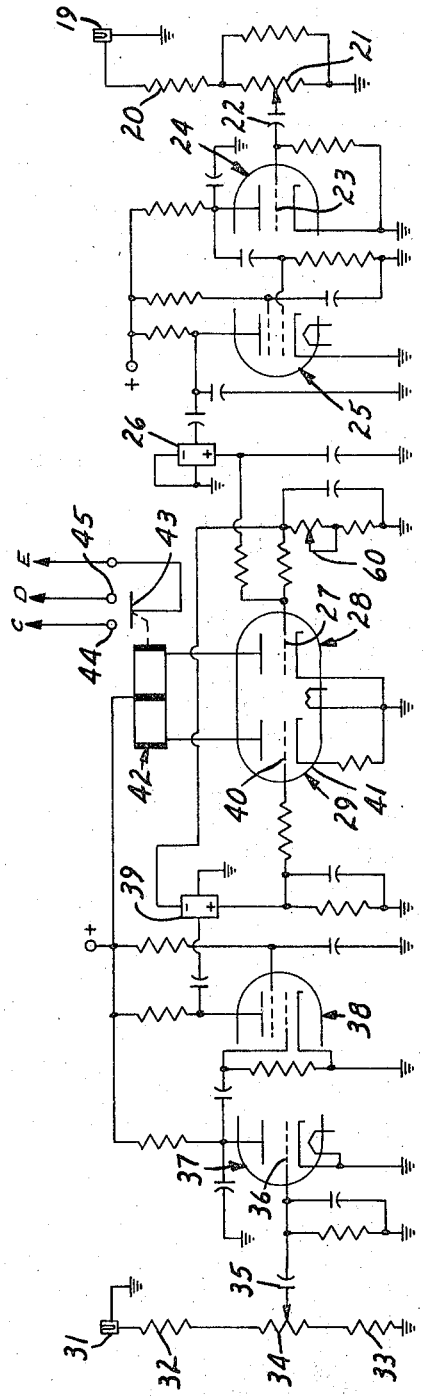
INVENTOR.
ALFRED J. LUDEN
BY
Merchant, Merchant + Gould
ATTORNEYS स
United States Patent Office 3,367,859
Patented Feb. 6, 1968

3,367,859
CONTROL DEVICE FOR ELECTRO-
PLATING BATH
Alfred J. Luden, Minneapolis, Minn., assignor to Bureau
of Engraving, Inc., Minneapolis, Minn., a corporation
of Minnesota
Filed Dec. 26, 1963, Ser. No. 333,561
2 Claims. (Cl. 204—228)

ABSTRACT OF THE DISCLOSURE

A control device for an electroplating bath wherein an AC component of the voltage across the bath is amplified and, through the use of a rectifier, utilized to produce a double ended signal to be applied to each input of a push-pull amplifier. The AC component of a voltage proportional to the current through the bath is applied to an amplifier and, through the use of a rectifier, a single ended signal is produced which is applied to one input of the push-pull amplifier and the signals are adjusted to provide a balanced condition for a desired current density in the bath. The two outputs of the push-pull amplifier are applied to a polarized relay having a first, a second, and a neutral state. When the outputs of the push-pull amplifier are balanced, the polarized relay is in the neutral state and there is no reaction in the following circuitry. When the push-pull amplifier outputs are unbalanced, the polarized relay moves either to the first or the second state and consequently closes contacts which activate a motor which in turn adjusts the voltage across the bath to change the current density and return it to the desired current density.

---

My invention relates to an electric control device for electroplating baths; and more particularly, it relates to an improved control device for maintaining current through the bath at an optimum value under varying load conditions.

In electroplating baths of the type here involved, a controlled alternating voltage source is rectified by a rectifier bridge circuit to apply a full wave rectified DC voltage potential across the cathode and anode of the bath circuit. Briefly, my control device amplifies a portion of the alternating component of the voltage across the bath and which amplified output is split and fed to the control grids of a push-pull output circuit; and in which at one control grid one-half of said amplified output is summed with an amplified voltage which is a function of the current through the bath. The output of the push-pull control tube may be utilized to control the current density through the bath in a number of ways; but as particularly shown, and hereinafter explained in more detail, the output controls the voltage potential across the bath through a suitable servomotor circuit.

Referring now more particularly to the drawings,
FIG. 1 is a schematic drawing of the electroplating bath circuit;
FIG. 2 is a schematic drawing of my improved control circuit for the electroplating bath circuit of FIG. 1; and
FIG. 3 is a schematic drawing of a suitable servomotor control circuit.

Referring to FIG. 1, line conductors 1 and 2 are adapted to be connected by plug 3 to a suitable source of AC line voltage which is applied through switch 4 and fuse 5 to an inductance coil 6 having a variable tap 7. The control of tap 7 will be referred to subsequently; however, as is well recognized, control thereof will apply a variable voltage to primary winding 8 of transformer 9 which has its secondary 10 connected to a full wave rectifier bridge circuit indicated generally by the numeral 11. The rectified output of bridge circuit 11 is applied through conductors 12 and 13 to the cathode 14 and anode 15 of an electroplating bath. In series connection in line or conductor 12 is a low resistant element 16 to provide a voltage or potential drop which will be a function of and directly proportional to the current through the electroplating bath. This voltage or potential drop is applied by conductor 12' and ground conductor 17 through plug element 18 (FIG. 1) and jack element 19 (FIG. 2) across fixed resistor 20 and variable resistor 21; and whereby, a proportion of the AC component of said voltage is applied through capacitor 22 to the grid 23 of an amplifier tube, indicated generally by the numeral 24. The output of tube 24 is further amplified by amplifier tube 25. The amplified output of tube 25 is rectified by rectifier 26 to apply the positive half-wave cycle thereof as a single ended input to a suitable control device such as the grid 27 of one triode portion, indicated by the numeral 28, of the push-pull output tube 29. For reference, the voltage applied to grid 27 from tube 25 may be considered as a bias voltage which is directly related to the current through the bath; and whereby a small variation in current through the bath may be detected at control tube 29 because of the amplification provided by tubes 24 and 25. The bias of grid 27 is also affected by the voltage across the bath as will be brought out from the following further description of the control circuit of FIG. 2.

The voltage across the bath is applied through plug element 30 (FIG. 1) and jack element 31 (FIG. 2) across fixed resistors 32 and 33 and variable resistor 34; and whereby, referring now to FIG. 2, a proportion of the AC component of the voltage or potential across the bath is applied through capacitor 35 to the grid 36 of amplifier tube 37. The output of tube 37 is further amplified by amplifier tube 38 and the output of amplifier 38 is rectified by rectifier 39 to provide a positive and negative component each proportional to the voltage across the bath. The positive and negative components, from the output of rectifier 39, are applied as a double-ended input to push-pull amplifier 29, the negative component being applied to the grid 27 of triode portion 28 and the positive component being applied to grid 40 of triode tube portion 41. Thus, the conduction of tube portion 41 of tube 29 is controlled by a proportion of the voltage across the bath, and the conduction of tube portion 28 of tube 29 is controlled by the summation of a proportion of the voltage across the bath and the aforesaid voltage which is a function of the current through the bath.

As shown in FIG. 2, the output of tube 29 controls a normally open electromagnetic relay or switch, indicated in its entirety by the numeral 42. The three contact elements of relay 42 are indicated for reference by the numerals 43, 44 and 45. When tube portions 28 and 41 are conducting in balance, relay 42 is in its normally open position as shown in FIG. 2, and when tube portions 28 and 41 are conducting in unbalance, either contacts 43 and 44 are in engagement or contacts 43 and 45 are in engagement, depending upon which tube portion is more conductive than the other.

It should be mentioned that suitable regulated B+ and B— plate and filament power supplies for the tubes of the circuit of FIG. 2 will be required, but these power supplies can be conventional and need not be shown or described.

Relay contacts 43, 44 and 45 form a part of the servomotor control circuit of FIG. 3. Referring to FIG. 3, I provide a reversible DC motor 46, which receives its operating voltage through DTDP switch 47.

When the movable contacts of switch 47 engage fixed contacts 48, the motor control circuit of FIG. 3 provides for manual operation of motor 46 through the manual actuation of switches 50, 51; and when the movable contacts of switch 47 engage fixed contacts 49, automatic control of motor 46 is actuated by relay 42. Bulb elements 52 and 53 merely indicate whether the servomotor control circuit of FIG. 3 is on manual or automatic operation. Switches 54 and 55 are limit switches; and each has an associated indicating bulb 56 and 57, respectively.

Indicating bulbs 58 and 59 will serve to indicate the direction of rotation of motor 46. Rotation of motor 46 in one direction acts to move arm or tap 7 of coil 6 in one direction to reduce the voltage applied to cathode 14 and anode 15; whereas, rotation of motor 46 in the opposite direction will serve to move arm or tap 7 in the opposite direction to increase the voltage applied to cathode 14 and anode 15.

It is not believed necessary to further describe the circuitry and operation of the servomotor control circuit of FIG. 3 in any more detail except that it might be mentioned that when movable contact 43 is actuated to engage fixed contact 44, motor 46 will operate in one direction; and when movable contact 43 is actuated to engage fixed contact 45, motor 46 will rotate in the opposite direction. Thus, on the automatic control position of switch 47, the position of tap 7 and the voltage applied to cathode 14 and anode 15 is controlled by my improved control circuit of FIG. 2, the operation of which will now be explained in more detail.

The control circuit of FIG. 2 has three variable resistor adjustments. Variable resistor 60 is a sensitivity adjustment control which may be adjusted to reduce the sensitivity of control tube 29 and prevent hunting of the servomotor 46. The primary adjustment controls are variable resistors 21 and 34. Adjustment of variable resistor 21 will control the proportion of the voltage applied to grid 27 which is a function of the current through the bath; and adjustment of resistor 34 will control the proportion of the voltage across the bath applied to grids 27 and 40 of control tube 29. Resistors 21 and 34 are adjusted to provide a fixed current density when tube 29 is in balance. This fixed current density may be varied by proper adjustment of resistors 21 and 34 for any particular electroplating job; and resistors 21 and 34 may be calibrated to provide any desired fixed current density when control tube 29 is in balance.

Assuming control tube 29 in balance and the desired optimum current density for a particular job is applied through the bath and thereafter, additional circuit boards are added to the bath for plating, this addition of circuit boards will decrease the resistance or load. This will result in an apparent drop in voltage applied and an increase in current through the bath. The increase in current will be recognized by, what might be termed, the current side of the circuit of FIG. 2, that is, amplifying tubes 24 and 25 which will result in an increase in voltage applied to grid 27 from amplifying tube 25. At the same time, the apparent decrease in voltage across the bath will be sensed by the voltage side of the circuit of FIG. 2, that is, amplifying tubes 37 and 38, which will result in an increase in bias on grid 40 and a decrease in bias applied to grid 27. This will result in unbalance of control tube 29, causing actuation of relay 42 and therefore, actuation of servomotor 46 to move tap 7 in a direction to increase the voltage across cathode 14 and anode 15 in an amount to put control tube back in balance and, therefore, back to the selected fixed current density desired in the bath. Similarly, a decrease in the amount of board area to be plated will cause servomotor 46 to operate in the opposite direction until control tube 29 is again in balance at the desired current density.

Calibration of the control circuit of FIG. 2 and adjustment of resistors 21 and 34 to provide a fixed optimum current density may be accomplished as follows. Circuit boards of known area may be inserted in the bath; and therefore, a measure of current through the bath will give a known current density. For this example, let us assume that we have one square foot of board area and it is desired to have a current density of two amps per square foot. A measure of two amps through the bath will give the desired current density for such board area. First, upon insertion of the one square foot board area, and with switch 47 in automatic position, that is, in contact with fixed contacts 49, the gain of resistor 21 is reduced to zero and resistor 34 is adjusted to provide two amps of current through the bath. Next, the gain of resistor 21 is increased which will require a slight re-adjustment of resistor 34 to again read two amps through the bath. Next, the board area in the bath is changed, and for example, a board of two square feet known area is inserted, which will call for four amps through the bath to provide the desired current density of two amps per square foot; and both resistors 21 and 34 will be successively adjusted to provide for the desired amperage reading of four amps. The bath is alternated between the board of one square foot and two square feet and resistors 21 and 34 adjusted as necessary until the ammeter will read two amps through the bath for the one square foot board and four amps for the two square foot board in the bath with the same fixed setting of resistors 21 and 34. The control is now calibrated to provide a fixed current density of two amps per square foot; and the control will automatically provide for such current density, regardless of changes in board area to be plated. Similarly, the resistors 21 and 34 may be calibrated to determine their positions for other desired current densities.

Thus, boards of unknown area may be accurately plated with the proper current density; and varying conditions in the bath will be automatically compensated for by the control of the servomotor.

It might be mentioned that the control circuit of FIG. 2 and the output of tube 29 thereof may be utilized to control an electroplating bath in ways other than the specific relay 42 and servomotor control of the voltage applied to the bath, shown and described. By way of example, the output of tube 29 may be utilized to control an SCR in the electroplating bath circuit of FIG. 1. Another similar form of control could provide for servomotor control of a variable resistor in the electroplating bath circuit of FIG. 1. Although I have shown a DC servomotor control, and although I prefer to utilize a DC servomotor, an AC servomotor and circuit therefor could be substituted.

The control circuit of my invention has been built and tested and found to accomplish its intended results. The amplification of the voltage components controlling the electroplating bath circuit provides for effective sensitivity; and the control has proved to be both effective and accurate.

It may be obvious to those skilled in the art that the specific embodiment of my invention herein disclosed may be modified in various ways to accomplish the intended result of my invention, and I intend to be limited solely by the scope of the appended claims.

What I claim is:

1. Control apparatus for controlling the current density of an electroplating bath comprising:
   (a) an alternating potential source;
   (b) rectifying means connecting said alternating potential source to said bath so as to apply a rectified unfiltered alternating voltage across the bath;
   (c) amplifying means for generating a first signal in direct response to the alternating portion of the voltage across the bath;
   (d) amplifying means for generating a second light in direct response to the alternating portion of the current through the bath;
   (e) a push-pull amplifier having first and second inputs and having a polarized relay connected in circuit therewith, said polarized relay having a first state, a second state, and a neutral state;

(f) means for rectifying said first signal to produce first and second polarity D.C. signals each responsive to the voltage across the bath;

(g) means for rectifying said second signal to produce a first polarity D.C. signal responsive to the current through the bath;

(h) means connecting said rectified first and second polarity signals responsive to the voltage across the bath to the first and second inputs of said amplifier respectively and the first polarity signal responsive to the current through the bath to the second input of said amplifier to cause a balanced condition in said amplifier thereby holding said relay in its neutral state, said relay operating to its first or second state in response to an unbalance of said amplifier due to a change in said first or second signals;

(i) and means responsive to the state of said relay to vary the magnitude of said alternating potential source to unbalance said amplifier thereby maintaining the current density of the bath substantially constant.

2. Control apparatus for controlling the current density of an electroplating bath comprising:

(a) an alternating potential source of variable magnitude;

(b) rectifying means connecting said alternating potential source to said bath so as to apply a rectified unfiltered alternating voltage across the bath;

(c) amplifying means for generating a first signal in direct response to the alternating portion of the voltage across the bath;

(d) amplifying means for generating a second signal in direct response to the alternating portion of the current through the bath;

(e) a push-pull amplifier having first and second inputs and having a polarized relay connected in circuit therewith, said polarized relay having a first state, a second state, and a neutral state;

(f) means for rectifying said first signal to produce first and second polarity D.C. signals each responsive to the voltage across the bath;

(g) means for rectifying said second signal to produce a first polarity D.C. signal responsive to the current through the bath;

(h) means connecting said rectified first and second polarity signals responsive to the voltage across the bath to the first and second inputs of said amplifier respectively and the first polarity signal responsive to the current through the bath to the second input of said amplifier to cause a balanced condition in said amplifier thereby holding said relay in its neutral state, said relay operating to its first or second state in response to an unbalance of said amplifier due to a change in said first or second signals;

(i) electrical motor means connected to said relay means, said motor means operating in a first direction when said relay is in its first state and in an opposite direction when said relay is in its second state;

(j) and means connecting said motor means to said alternating potential source to vary the magnitude of said potential source, the change in magnitude of said potential producing a change in magnitude of said first and second D.C. signals and rebalancing of said amplifier, thereby maintaining the current density of the bath substantially constant.

References Cited

UNITED STATES PATENTS

| | | | |
|---|---|---|---|
| 2,584,816 | 2/1952 | Sands | 204—231 |
| 2,914,717 | 11/1959 | Redding | 318—20.810 |
| 3,063,929 | 11/1962 | Phelan | 204—228 |
| 3,067,123 | 12/1962 | Huber | 204—195 |
| 3,151,283 | 9/1964 | Armstrong et al. | 318—20.810 |

ROBERT K. MIHALEK, *Primary Examiner.*